(12) United States Patent
Mangelsen et al.

(10) Patent No.: US 6,921,011 B1
(45) Date of Patent: Jul. 26, 2005

(54) WORK PIECE HOLDER HAVING TOP MOUNTED ROBOT AND METHOD OF USE

(75) Inventors: Jan C. Mangelsen, Charlotte, IA (US); Jason J. Kelsick, Bettendorf, IA (US); John P. Christen, Davenport, IA (US)

(73) Assignee: GSG, LLC, Davenport, IA (US)

( * ) Notice: Subject to any disclaimer, the term of this patent is extended or adjusted under 35 U.S.C. 154(b) by 218 days.

(21) Appl. No.: 10/315,536

(22) Filed: Dec. 10, 2002

(51) Int. Cl.$^7$ .............................................. B23K 37/00
(52) U.S. Cl. ....................... 228/44.3; 228/45; 228/47.1
(58) Field of Search ......................... 228/18, 44.3, 45, 228/47.1, 212

(56) References Cited

U.S. PATENT DOCUMENTS

| | | | | |
|---|---|---|---|---|
| 4,713,873 A | * | 12/1987 | Gold et al. .................... | 29/559 |
| 4,719,328 A | * | 1/1988 | Yanagisawa et al. ......... | 219/79 |
| 4,813,587 A | * | 3/1989 | Kadowaki et al. ........... | 228/4.1 |
| 5,083,070 A | | 1/1992 | Poupard et al. | |
| 5,267,683 A | * | 12/1993 | Hamada et al. .............. | 228/4.1 |
| 5,873,569 A | | 2/1999 | Boyd et al. | |
| 5,921,459 A | * | 7/1999 | Heraly et al. ................. | 228/45 |
| 6,027,005 A | * | 2/2000 | Gentner ....................... | 228/6.1 |
| 6,036,082 A | * | 3/2000 | Caldarone ................... | 228/212 |
| 6,089,440 A | * | 7/2000 | Brusha ........................ | 228/44.3 |
| 6,347,733 B1 | * | 2/2002 | Hickey, II ................... | 228/49.1 |
| 6,375,178 B1 | | 4/2002 | Schilb et al. | |
| 6,450,490 B1 | * | 9/2002 | Mangelsen et al. ........... | 269/43 |
| 6,467,675 B1 | * | 10/2002 | Ozaku et al. ............... | 228/175 |
| 6,622,906 B1 | * | 9/2003 | Kushibe ..................... | 228/212 |

* cited by examiner

Primary Examiner—Kiley S. Stoner
(74) Attorney, Agent, or Firm—McKee, Voorhees & Sease, P.L.C.

(57) ABSTRACT

The invention relates to a work piece holder with top mounted robot which optimizes floor space for a work piece positioner and a robot. In general, the work piece positioner assembly and the top mounted robot is supported on a base frame. Attached to the base frame, is a first superstructure and a second superstructure which supports a work piece positioner and the top mounted robot. Above the first superstructure and second superstructure is a frame structure fixed in the unitary assembly to the first superstructure and the second superstructure. Attached to the frame structure is a robot stand and a robot. Due to the unique shape of the work piece holder with top mounted robot, the floor space of the combined robot and work piece positioner is significantly reduced, and the overall cost of the system is reduced.

10 Claims, 4 Drawing Sheets

US 6,921,011 B1

WORK PIECE HOLDER HAVING TOP MOUNTED ROBOT AND METHOD OF USE

BACKGROUND OF THE INVENTION

The present invention relates generally to a positioning device and a robotic system, and specifically to a work piece holder with top mounted robot. An operator places the work piece on one side of the work piece holder at a loading station while a robot mounted over the work piece holder processes another work piece in a working station. The robot then ceases work upon the piece and disengages. The fixture then rotates in a reciprocating motion to reverse the two work pieces.

The invention specifically improves upon the traditional positioner design currently employed by those in the prior art. Although positioner design currently employed in the art may have a Ferris-wheel configuration for moving a work piece from a loading station to a working station, it has not yet been known to mount a robot onto the same superstructure as the work piece holder.

Several problems with the traditional-type positioner occur when a floor robot is needed to work upon a work piece in the working position. For example, the Ferris-wheel positioner may not always provide a good location relative to the floor robot position. As a further example, the floor space or footprint that is required by a separate Ferris-wheel positioner and a separate floor robot is greater. While this invention may be applicable to a Ferris-wheel type positioner, it will work with other types of work-piece positioners as well.

It is therefore a primary objective of the present invention to provide a work piece holder with top mounted robot that may support a positioning device and a top mounted robot.

A further objective of the present invention is to provide a robot mounted on a positioning device that is more efficient by not interfering with the operation of the positioning device. In addition, an objective of the present invention is to allow for repositioning of the work piece while maintaining the robot's position relative to the work piece holder.

A further objective of the present invention is to provide a device which is easy to use and economical to manufacture.

A further objective of the present invention is to provide a work piece holder and robot which minimizes floor space and maximizes robot reach, while at the same time retaining the flexibility of robotic motion achieved with prior art devices.

A further objective of the present invention is the provision of the work piece holder with top mounted robot to reduce the overall cost of the system yet maintaining a robot in part relationship by eliminating a separate base frame for the robot.

A still further objective of the present invention is to provide a new, safe design.

A still further objective of the present invention is the provision of an improved work piece holder with top mounted robot which allows a more efficient use of space and a small footprint while still meeting ANSI-IRA space R-14 standards.

A still further objective of the present invention is the provision of an improved work piece holder with top mounted robot which is economical, efficient in use, and which results in a durable assembly yet allowing for better programming access of an operator and conserving floor space.

The means and method of accomplishing these and other objectives will become apparent from the following description of the invention.

BRIEF SUMMARY OF THE INVENTION

The foregoing objectives may be achieved by a robot top mounted upon a work piece holder.

A workstation of the present invention utilizes a base, a work piece holder operatively connected to the base, a holder drive for selectively moving the work piece holder from a loading station to a working station, a support structure attached to the base, a support structure, and a frame structure for attachment of a robot stand and a robot. The support structure is capable of supporting the weight of a frame structure, at least one robot stand, and at least one robot.

The invention may also have a base frame, a work piece holder that is moveably mounted to the base frame and capable of supporting a work piece, and a robotic tool attached to the base frame and being moveable for performing robotic tasks upon the work piece.

The method of the present invention comprises taking a work piece holder being moveably mounted to a base frame, moving the work piece holder from a first holder position wherein the work piece is adjacent a loading station, to a second holder position wherein the first work piece support is adjacent the loading station and the second work piece support is adjacent to the working station, mounting a robotic tool upon the base frame, and moving the robotic tool to the working station to perform robotic tasks upon a work piece.

DETAILED DESCRIPTION OF THE PREFERRED EMBODIMENT

Figure 1:
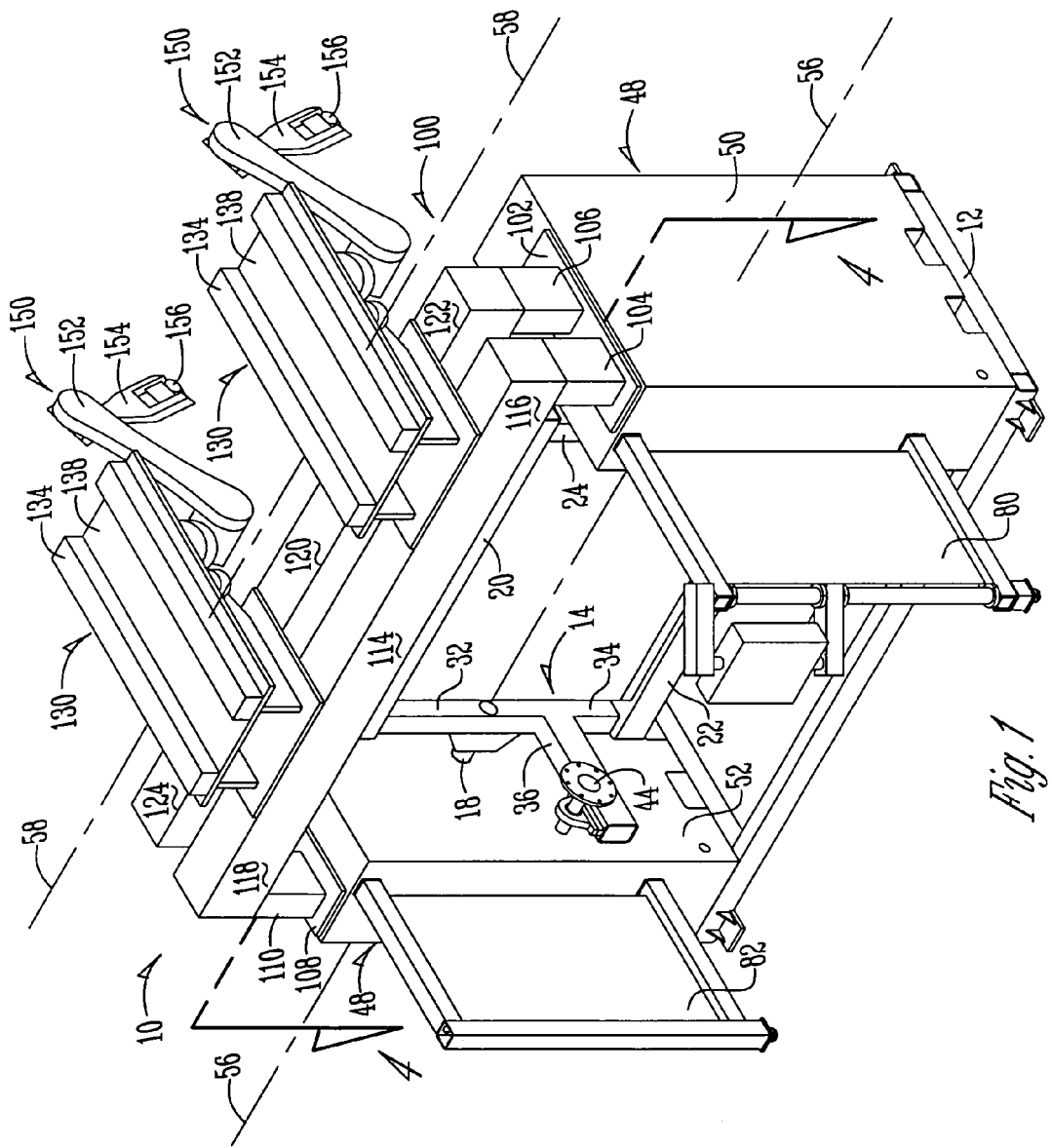
FIG. 1 is a perspective view of the work piece holder with top mounted robot.

Referring to the drawings, numeral 10 generally refers to the workstation of the present invention which comprises a base or base frame 12; a work piece positioner assembly, rotary work piece holder, or work piece holder 14; a support structure 48; a frame structure, upper frame member, or frame structure 100; a stand or inverted robot stand 130, and a robot 150.

As seen in FIG. 1, Base 12 is the grounding surface of the invention. The footprint of the workstation 10 is the floor space the entire workstation 10 occupies.

Figure 2:
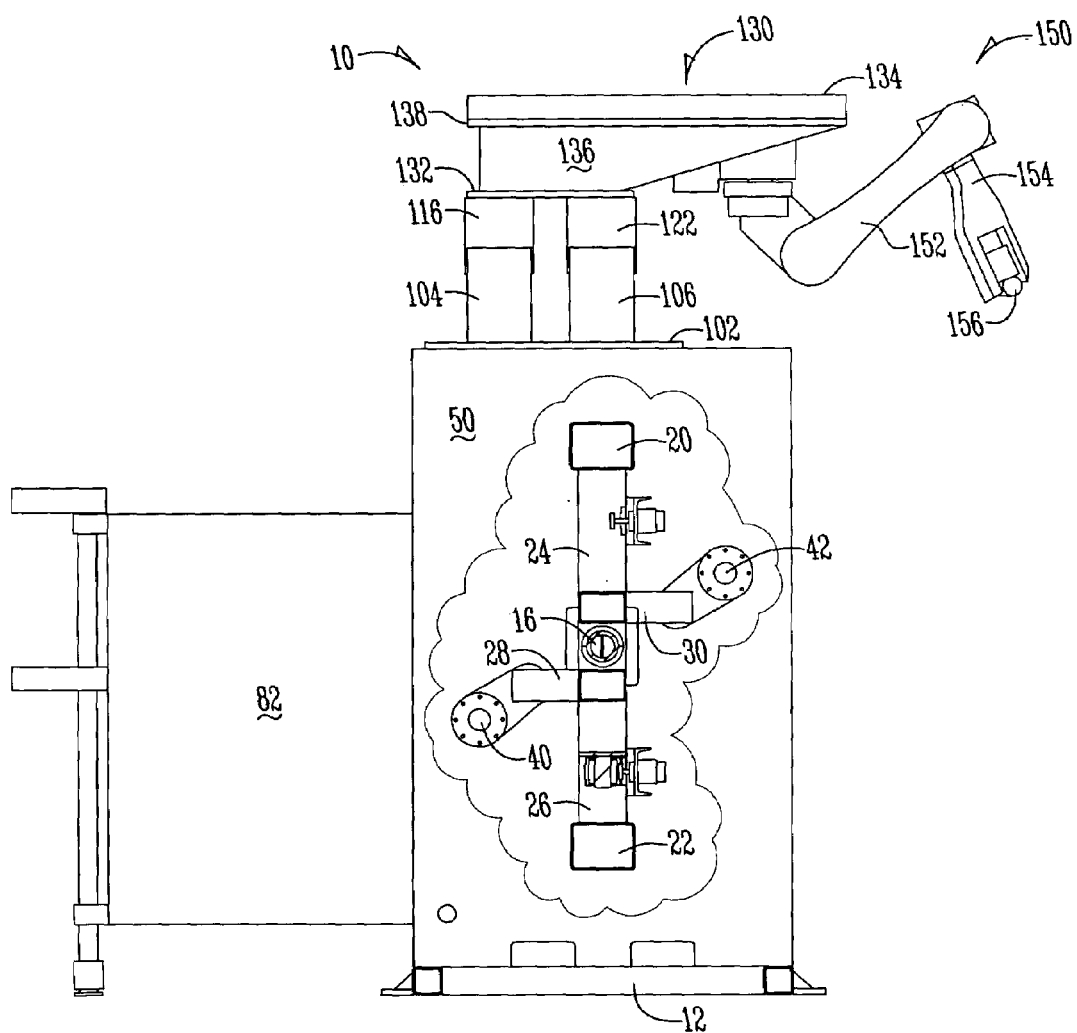
FIG. 2 is a side plan view of the device of FIG. 1 with cut-away section exposing a portion of the work piece holder.
Figure 4:
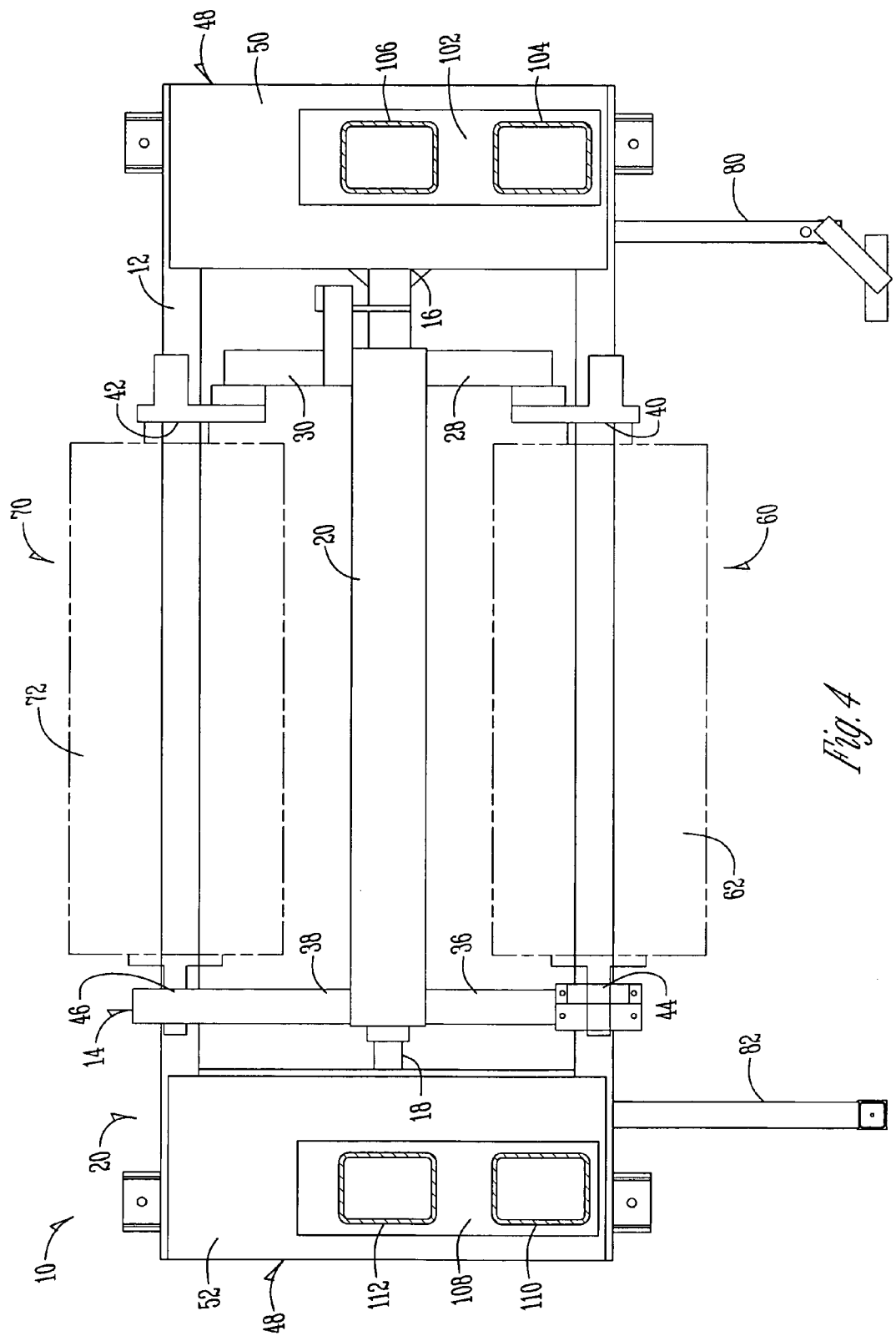
FIG. 4 is a sectional view taken along line 4—4 in FIG. 1 and shows the loading station and the working station.

The work piece holder 14 is known in the art as a Ferris-wheel style positioner. Referring to FIG. 1, FIG. 2, and FIG. 4, the work piece holder 14 has a headstock drive end section 16 and a tailstock idler end section 18 with upper and lower cross tubes or tie bars 20, 22 extending there between. These tie bars serve as rotating means, wherein the rotation of headstock drive end section 16 is imparted to tailstock idler end section 18. The headstock drive end section 16 is imparted to tailstock idler end section 18. The headstock drive end section 16 of the work piece positioner assembly 14 has an upper support arm 24, a lower support arm 26, a first drive arm 28 and a second drive arm 30. The tailstock idler end section 18 of the work piece holder 14 has an upper support arm 32 corresponding to the upper support arm 24, a lower support arm 34 corresponding to the lower support arm 26, a first idler arm 36 corresponding to the first drive arm 28 and a second idler arm 38 corresponding to the second drive arm 30. The upper tie bar 20 extends from the upper support arm 24 to the upper support arm 32. The lower tie bar 22 extends from the lower support arm 26 to lower support arm 34.

The first work piece (not shown) can be supported at one end by the first work piece drive support 40 and at a second end by the first work piece idler support 44. A second work piece (not shown) can be supported by the second work piece drive support 42 at one end by the second work piece idler support 46 at the other. Any means known in the art for attaching the work piece between said supports 40, 42, 44, 46, would be within the scope of the invention.

The base 12 provides the point of attachment for the support structure 48. The support structure has a first superstructure or first work piece support 50 and a second superstructure or second work piece support 52. The first superstructure 50 and the second superstructure 52 are attached to the base 12 and provide a support for the work piece holder 14, the frame structure 100, the stand 130, and the robot 150. The first superstructure 50 is generally referred to as the headstock, and the second superstructure 52 is generally referred to as the tailstock. The terms headstock and tailstock are used throughout the application as descriptors of physical locations.

The workstation 10 comprises an approximate work piece positioner horizontal mass centerline 56 defined by the base 12, the work piece holder 14, and the support structures 50, 52. The workstation has an approximate implement horizontal mass centerline 58 defined by the frame structure 98, the stand 130, and the robot 150.

An alignment station (not shown) and wire feed (not shown) are located off of the headstock and tailstock superstructure 50, 52 positioned for both robot and operator access.

Work pieces are generally positioned between the headstock drive end section 16 and tailstock idler end section 18 of the work piece positioner assembly 14 at a loading station 60 and a working station 70. The first work piece (not shown) has a first work piece location 62. The second work piece (not shown) has a second work piece location 72.

In the preferred embodiment, the work piece positioner assembly drive means (not shown) as well as other mechanical components such as gearboxes and reducers are located within first superstructure 50. The work piece positioner assembly drive means rotates the work piece positioner assembly 14. These electric motors can be found in the existing art.

Alternatively, the work piece positioner assembly drive means may be any means such that a work piece holder 14 with first and second work piece supports may move a work piece from a loading station 60 with the work piece in a first work piece position 62 to a working station 70 with the work piece in a second work piece position 72.

A headstock end side guard 80 and a tailstock end side guard 82 prevent damage and/or injury to the flanks of the device 10.

As seen in FIG. 1, the workstation has a first superstructure 50 and a second superstructure 52. First superstructure 50 and second superstructure 52, in the preferred embodiment, support the weight of a frame structure or upper frame member 100 at least one stand 130 and at least one robot 150. Alternatively, the superstructure combination, 50, 52 can support a frame structure 100, two stand 130, and two robot 150. Alternatively, the superstructure may support a frame structure 100, three stand 130, and three robot 150.

Figure 3:
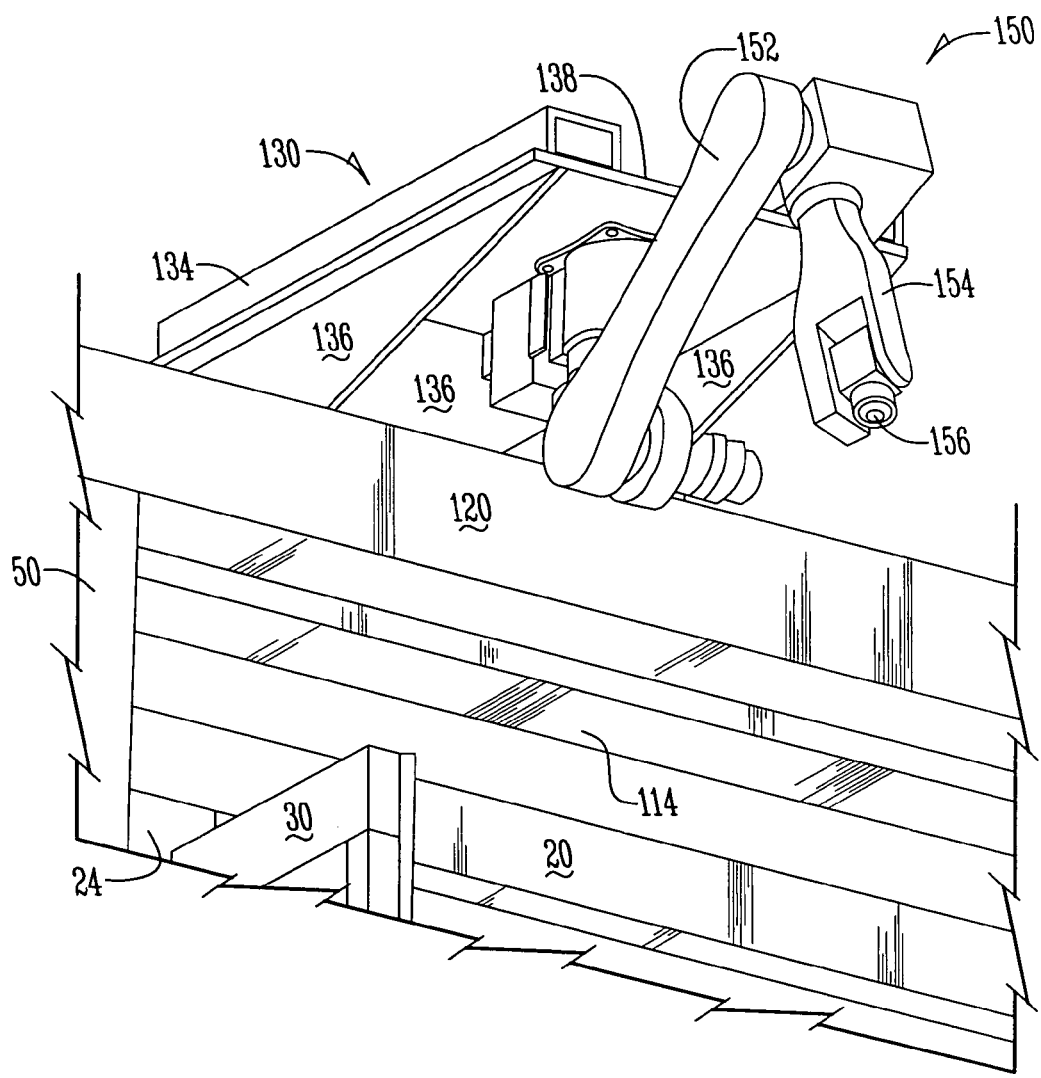
FIG. 3 is a partial front perspective view of the device of FIG. 1.

As seen in FIGS. 1–3, the frame structure comprises a first frame bridge 114 and a second frame bridge 120. The first frame bridge 114 has a first frame bridge headstock end 116 and a first frame bridge tailstock end 118. The second frame bridge 120 has a second frame bridge headstock end 122 and a second frame bridge tailstock end 124.

As seen in FIG. 1 and FIG. 2 the frame structure 100 has extension members that raise first frame bridge 114 and second frame bridge 120 away from the superstructure 50 and the second superstructure 52. The first frame bridge 114 has a first extension member 104 attached at the first frame bridge headstock end 116. The first frame bridge 114 has a tailstock first extension member 110 attached at first frame bridge tailstock end 118. The second frame bridge 120 has a second extension member 106 attached at the second frame bridge headstock end 122. The second frame bridge 120 has a tailstock second extension member 112 at a position of second frame bridge tailstock end 124.

The headstock first extension member 104 and the headstock second extension member 106 are joined to headstock frame base 102. In addition, the tailstock first extension member 110 and the tailstock second extension member 112 are joined to tailstock frame base 108. Headstock frame base 102 is attached to superstructure 50. Tailstock frame base 108 is attached to second superstructure 52. The means of attaching headstock frame base 102 and tailstock frame base 108 are means well known in the art but may comprise nuts and bolts.

Supported by the superstructure 50, 52 and the frame structure 100, as seen in FIGS. 1–3, is an inverted robot stand or stand 130 and robot 150.

The stand 130 has a stand base 132, a stand top 134, and a stand body 136 defined by the stand base 132 and stand top 134. The stand 130 also has a robot attachment surface 138 at which point a robot 150 may be attached by means well known in the art.

The robot 150 has a robot arm 152, a robot implement arm 154, and a robot implement adapter 156. The robot 150 is of a type known in the art. Typically, the robot 150 is operated according to a predetermined program adapted to the work piece in question. Typically, the implement arm adapter 154 contains a welding apparatus at an implement adapter point 156 which is used to perform operations on the work piece. However, these functions are well known in the art.

The frame structure 100, the inverted robot stand 130, and the robot 150 have an approximate implement horizontal mass centerline 58. While frame structure 100 may utilize a truss, other support members such as tubes or beams could be used without detracting from the invention. At static rest, the work piece positioner horizontal mass centerline 56 is in approximate vertical alignment with the implement mass centerline 58. Alternatively, the work piece positioner horizontal mass centerline 56 is in approximate vertical alignment with the implement mass centerline 58 when the robot 150 is in dynamic motion.

In operation, a work piece supported on a work piece positioner assembly 14 will be moved between a first holder position wherein the first work piece support is adjacent the working station and the second work piece drive support is adjacent to a loading station 60. This work piece holder 14 is moveably mounted to the base frame and capable of moving in a 180° cycle to bring a work piece from the loading station 60 side to the workstation 70 side. The robot 150 mounted on the inverted robot stand 130 attached to the frame structure 100 is then able to perform tasks upon the work piece at the working station 70.

A headstock end side guard 80 and a tailstock end side guard 82 prevent damage and/or injury to the flanks of the device 10.

The above-described preferred embodiment achieves teachings not known in the traditional positioner design as employed by those in the prior art. The embodiments as described above allow for the positioner to have a beneficial location relative to the robot.

The work piece positioner and the robot share a common base and therefore the floor space or footprint needed for the above embodiments is much smaller than those positioner designs currently employed in the prior art. In this position, the invention is more efficient than other positioner designs employed in the prior art because the robot can be moved up and away from the operation of the work piece positioning device.

In addition, these embodiments provide for moving the work piece holder but still maintaining the relationship between the work piece holder and the robot. This may be done because the work piece holder and the robot are attached together.

The work piece holder with top mounted robot is more economical to manufacture than other positioner designs in the prior art. This economy results from the work piece holder and the robot sharing a similar support.

Finally, because of the embodiment's compact design and unique positioning of moving parts, the present invention is safer and uses space more efficiently. The embodiments employ a small footprint while still meeting ANSI-IRA R-14 standards.

In the drawings and specifications there has been set forth a preferred embodiment of the invention, and although specific terms are employed, these are used in a generic descriptive sense only and not for purposes of limitation. Changes in the form and the proportion of parts as well as in the substitution of equivalents are contemplated as circumstance may suggest or render expedient without departing from the spirit or scope of the invention in the following claims.

What is claimed is:

1. A workstation comprising:
   a base;
   a work piece holder operatively connected to said base;
   holder drive for selectively moving said work piece holder from a loading station to a working station;
   a support structure attached to said base;
   said support structure capable of supporting a weight of a frame structure and of at least one robot stand and of at least one robot;
   a frame structure attached to said support structure adapted for attachment of at least one robot stand and of at least one robot;
   at least one stand attached to the frame structure;
   said stand having a stand base, a stand top, and a stand body attached to said stand base and said stand top; and
   a surface attached to said stand top adapted for attachment of a robot.

2. The workstation according to claim 1 wherein said workstation further comprises at least one robot attached to said stand.

3. A workstation comprising:
   a base;
   a support structure attached to said base;
   a work piece holder operatively connected to said support structure;
   holder drive for selectively moving said work piece holder from a loading station to a working station;
   said support structure capable of supporting a weight of a frame structure and of at least one robot stand and of at least one robot;
   a frame structure attached to said support structure adapted for attachment of at least one robot stand and of at least one robot;
   first and second work piece supports on said work piece holder.

4. The workstation according to claim 3 wherein said support structure comprises a first superstructure attached to said base wherein said first work piece support is on said first superstructure, and a second superstructure attached to said base wherein said second work piece support is on said second superstructure.

5. A workstation comprising:
   a base;
   a work piece holder operatively connected to said base;
   holder drive for selectively moving said work piece holder from a loading station to a working station;
   a support structure attached to said base;
   said support structure capable of supporting a weight of a frame structure and of at least one robot stand and of at least one robot;
   a frame structure attached to said support structure adapted for attachment of at least one robot stand and of at least one robot;
   said support structure having a first superstructure attached to said base, and a second superstructure attached to said base;
   said frame having a first bridge with a first bridge headstock end attached to the first superstructure, and a first bridge tailstock end attached to the second superstructure; and
   a second bridge with a second bridge headstock end attached to the first superstructure, and a second bridge tailstock end attached to the second superstructure.

6. The workstation according to claim 5 wherein said frame further comprises a headstock extension member attached to said first bridge headstock end and said second bridge headstock end, and a tailstock extension member attached to said first bridge tailstock end and said second bridge tailstock end.

7. The workstation according to claim 6 wherein said frame further comprises a headstock frame base attached to said headstock extension member, and a tailstock frame base attached to said tailstock extension member.

8. A workstation comprising:
   a base;
   a work piece holder operatively connected to said base;
   holder drive for selectively moving said work piece holder from a loading station to a working station;
   a support structure attached to said base;
   said support structure capable of supporting a weight of a frame structure and of at least one robot stand and of at least one robot;
   a frame structure attached to said support structure adapted for attachment of at least one robot stand and of at least one robot;

said support structure having first and second opposing, spaced-apart superstructures, each superstructure having a lower end attached to the base and an upper end;
said frame structure extending between said first and second superstructures and attached to the upper end of the first and second superstructures for attachment of at least one robot stand in at least one robot;
at least one work piece holder upon said support structure.

9. The work station according to claim 8 further comprising a first work piece support on said first superstructure and a second work piece support on said second superstructure.

10. The work station of claim 8 wherein said first and second work piece holders are capable of rotating between a loading station and a working station.

* * * * *